US006188551B1

(12) United States Patent
Yoo

(10) Patent No.: US 6,188,551 B1
(45) Date of Patent: Feb. 13, 2001

(54) METHOD OF CONTROLLING COMPRESSOR FOR REFRIGERATOR

(75) Inventor: Han-Ju Yoo, Kwangju (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/276,821

(22) Filed: Mar. 26, 1999

(30) Foreign Application Priority Data

Jul. 30, 1998 (KR) ........................................ 98-30848

(51) Int. Cl.[7] .............................................. H02H 5/04

(52) U.S. Cl. ............................ 361/23; 361/28; 361/78; 361/799; 361/806

(58) Field of Search ......................... 361/78, 23, 28–29; 318/434, 798–803, 806–807

(56) References Cited

U.S. PATENT DOCUMENTS 4,965,504 * 10/1990 Ueda et al. ......................... 318/802
5,262,704 * 11/1993 Farr ..................................... 318/434

FOREIGN PATENT DOCUMENTS 2-64382 3/1990 (JP) .
6-105592 4/1994 (JP) .
6-133591 5/1994 (JP) .
9-84387 3/1997 (JP) .

* cited by examiner

*Primary Examiner*—Michael J. Sherry
(74) *Attorney, Agent, or Firm*—Robert E. Bushnell, Esq.

(57) ABSTRACT

A method of controlling a refrigerator including a power supply unit, an inverter applying three-phase power to a compressor is disclosed. The compressor is driven initially for a predetermined period of time. If the RPM of the compressor is not within the range between a maximum and a minimum RPM, a controller determines a malfunction of the compressor or a disconnection between the inverter and compressor during the predetermined period of time. The controller increases the number of the malfunction by one whenever the malfunction is determined. If the increased number is greater than a given number, the controller stops the compressor and alerts user to the malfunction.

22 Claims, 5 Drawing Sheets

15
20
TR1
TR3
TR5
TR2
TR4
TR6
30
Power supply unit
Compressor
Inverter driving part
60
Position sensing part
40
50
A
B
C
70
Timer
Control part
80
Alarm

METHOD OF CONTROLLING COMPRESSOR FOR REFRIGERATOR

CLAIM OF PRIORITY

This application makes reference to, incorporates the same herein, and claims all benefits accruing under 35 U.S.C. §119 from an application for CONTROL METHOD OF INVERTER REFRIGERATOR earlier filed in the Korean Industrial Property Office on the 30$^{th}$ of July 1998 and there duly assigned Serial No. 98-30848.

BACKGROUND OF THE INVENTION

1. Technical Field

The present invention generally relates to a method of controlling a compressor for a refrigerator. More particularly, it relates to a method for detecting a malfunction of the compressor and a connection trouble between the compressor and an inverter circuitry during initial driving of the compressor in a refrigerator.

2. Background Art

Inverters and compressors driven by the inverter have been widely used in refrigerators. Typically, a controller controls the inverter to drive a D.C. motor of the compressor. Also the controller detects a reverse electromotive force (a reverse induction voltage) of the D.C. motor and evaluates a rotation position of a rotor of the D.C. motor. Accordingly, the controller controls the inverter to drive the D.C. motor by using the rotation position of the rotor as a feedback signal.

The controller, however, may fail to control the inverter because of a malfunction of the compressor and a disconnection between the compressor and the inverter. Even if the controller receives the reverse electromotive force and detects the position of the rotor of the D.C. motor, the controller cannot control the inverter and the D.C. motor precisely. This is because the controller merely uses the position of the rotor from the reverse electromotive force for adjusting the inverter. The controller does not use the position of the rotor for detecting the malfunction of the compressor and the disconnection between the compressor and the inverter. Accordingly, the refrigerator cannot be controlled effectively. Moreover, the motor and the inverter may be overloaded or overheated because the controller continues to control the inverter to drive the motor. Furthermore the foodstuffs may be spoiled if rotation speed of the motor is not in a normal mode, or the motor is turned off. Therefore, I have founded that a new method is needed to detect the malfunction of the compressor and a disconnection between the compressor and the inverter in order to avoid a malfunction of the controller and to improve the refrigerator's ability.

SUMMARY OF THE INVENTION

An object of this invention is to provide a refrigerator with an improved method of controlling a D.C. motor of a compressor.

It is another object of this invention to provide a method driving a D.C. motor and controlling a controller more effectively.

It is an yet another object of this invention to provide an improved method able to determine a malfunction and a disconnection between an inverter and a D.C. motor from a reverse electromotive force.

It is still another object of this invention to provide a method able to controlling an inverter corresponding to the determination of the malfunction and the disconnection between the inverter and the D.C. motor.

It is further object of this invention to provide an improved method able to prevent the motor and the inverter from being overloaded and overheated.

It is another further object of this invention to provide an method able to alert user to the malfunction in order to protect the invertor and the D.C. motor.

These and other objects may be achieved by using a frequency of a rotor obtained from a reverse electromotive force for determining the malfunction and the disconnection between the inverter and the D.C. motor. The controller compares the frequency of the D.C. motor with a reference frequency. Also the controller increases the number of times whenever the frequency is greater than the reference frequency within a predetermined period of time. The number is compared with a reference number. A alert signal is generated when the number is greater than the reference number. The controller may control the inverter not to drive the D.C. motor in order to avoid overheating and overloading of the inverter and the D.C. motor.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
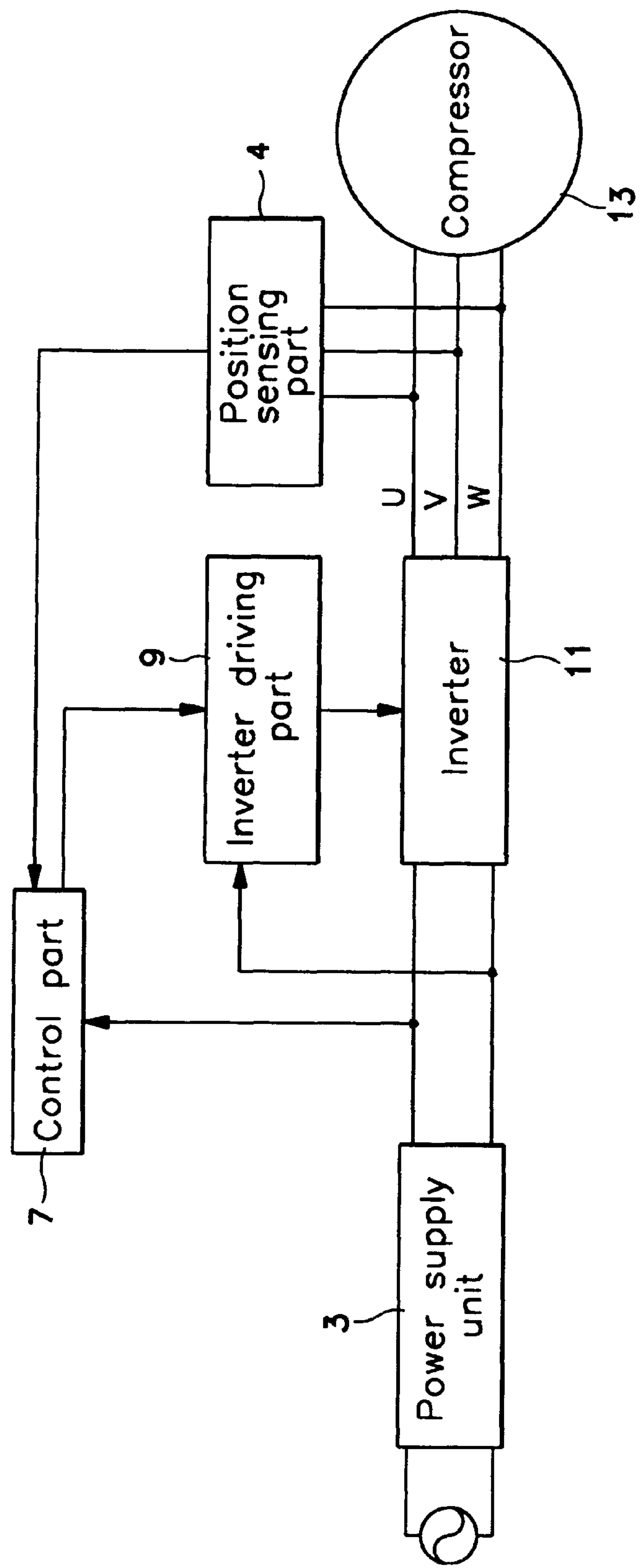
FIG. 1 is a block diagram of a conventional control system in a refrigerator.

FIG. 1 is a block diagram of a conventional control system in a refrigerator. The conventional refrigerator includes a power supply unit 3, an inverter 11 that converts D.C. voltages into three-phase powers, and a compressor 13. The inverter 11 drives a brushless D.C. motor (not shown) in the compressor 13 by using the three-phase powers. Position sensing part 4 detects a position of a rotor (not shown) of D.C. motor from reverse electromotive forces generated from the D.C. motor and determines a frequency of the rotor, such as a revolution per minute (RPM), of D.C. motor in compressor 13. Control part 7 generates a control signal to control inverter driving part 9 by using an output signal of the position sensing part 4. Inverter driving part 9 produces a driving signal to the inverter 11 so as to operate the compressor 13 on the basis of the control signal from the control pair 7. Inverter 11 alternately turns on or turns off six power transistors (not illustrated) on the receipt of the driving signal output. Thus, the inverter 11 converts the D.C. voltages into three phase power signals.

The following description is relating to the operation of the conventional refrigerator. The controller 7 produces the control signal to the inverter driving part 9 to control the inverter 11. The inverter 11 alternately turns on or off the six power transistors of the inverter 11 to apply the three-phase powers to compressor 13. In order to initiate the rotation of the brushless D.C. motor of compressor 13, the control part 7 gives a specific switching signal to the inverter 11 through the inverter driving part 9 for an initial period of time without regard to the position and frequency of the rotor, thereby rotating the D.C. motor of compressor 13. The position sensing part 4 does not recognize the position and the frequency of the rotor until the RPM of the D.C. motor reaches a certain RPM. The control part 7 normally controls the compressor 13 by using a position detecting signal produced by the position sensing part 4 when compressor 13 is driven at a given RPM. That is, the control part 7 applies the switching signal to the inverter 11 regardless of the rotor's position during initial driving of the compressor 13. In the initial driving of the compressor 13, the position sensing part 4 can not sense the position of the rotor exactly if the inverter 11 is not connected with the compressor 13 due to a connection trouble or a disconnection of the three-phase power lines u, v and w. The reverse electromotive force is not normally generated since the compressor 13 does not normally rotate. Accordingly the position sensing part 4 can not produce a accurate position detection signal of the rotor.

However, the position detection signal may be generated from the position sensing part 4 by the switching signals of the power transistors within the inverter 11, even though the compressor 13 does not rotate. Thus, the control part 7 regards the abnormal position detection signal as a signal representing that the compressor is rotating. Although the abnormal position detection signal is generated by the abnormal reverse electromotive force produced by the turned-on and turned-off operation of power transistors within the inverter 11, the controller 7 regards as a normal mode and continues to control the compressor on the basis of the abnormal position detection signal without knowing a connection trouble between the compressor 13 and the inverter 11. As a result, a user is not aware of this erroneous operation, and the actual refrigerating cycle is not performed normally. Yet, foodstuffs in the refrigerator can be spoiled. Moreover, the power can be greatly consumed. Furthermore, the components and the compressor of the refrigerator may be damaged unless the rotation speed reach desired speed within a given period of time.

Figure 2:
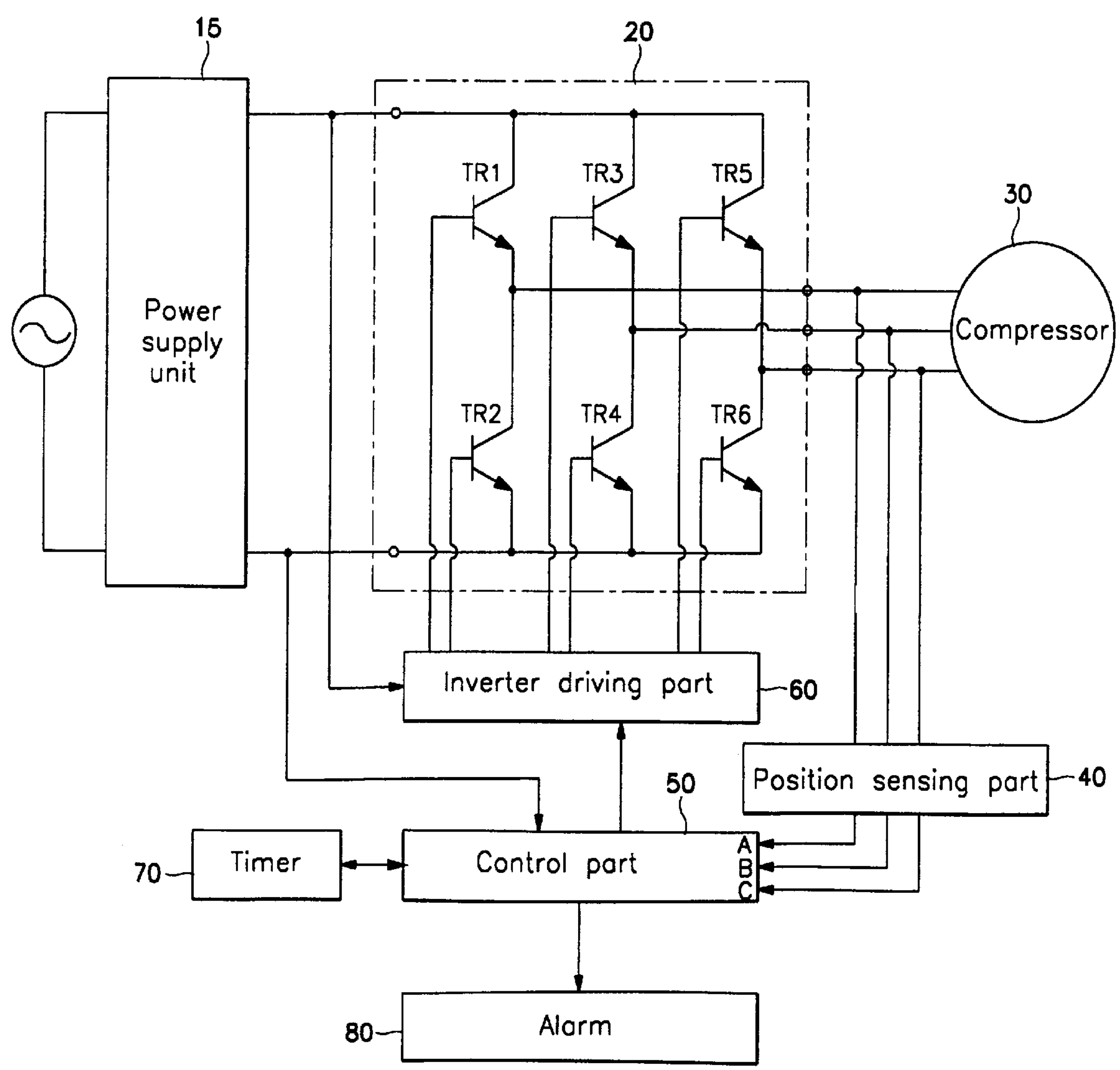
FIG. 2 is a block diagram of control system of a refrigerator according to the present invention.

FIG. 2 is a block diagram of control system of a refrigerator according to the present invention. Once an AC power source is applied to a power supply unit 15, AC voltage is converted to DC voltage. Inverter 20 generates three-phase powers through three power lines u, v, and w which are connected between the inverter 20 and the compressor. Timer 70 and alarm 80 are connected to a control part 50. Position sensing part 40 is connected to three-phase power lines between the inverter 20 and the compressor 30. The position sensing part 40 receives the reverse electromotive force information through the three phase power lines and detects the position of the rotor of the compressor. The position sensing part 40 produce corresponding signal to three input terminals A, B and C of a control part 50.

At the initial operation, the control part 50 does not recognize the position of the rotor of compressor 30 for a first period of time and applies switching signals to six power transistors TR1 to TR6 within the inverter 20, thereby forcing the D.C. motor of compressor 30 to rotate. This period is referred to an initial-step driving period. If the initial step-driving period is maintained for a long period of time, then it causes the internal components and the compressor 30 to be damaged. Therefore, the period of the initial step-driving is set to 5 seconds.

Figure 3A:
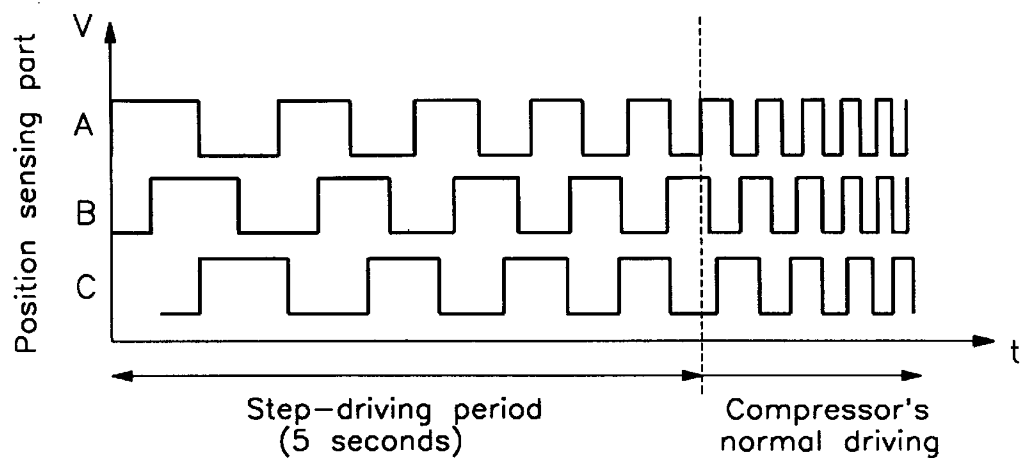
FIGS. 3A to 3C show timing charts of output signals of a position sensing part according to the present invention.
Figure 3B:
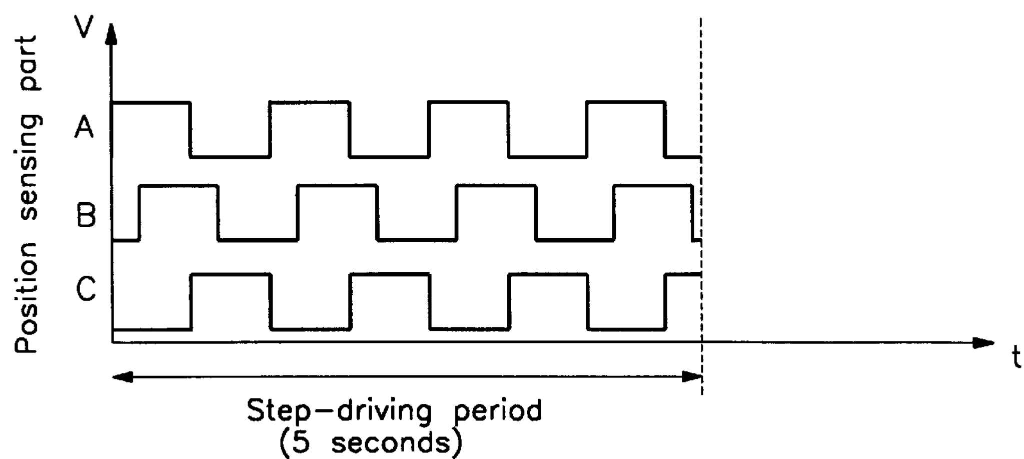
Figure 3C:
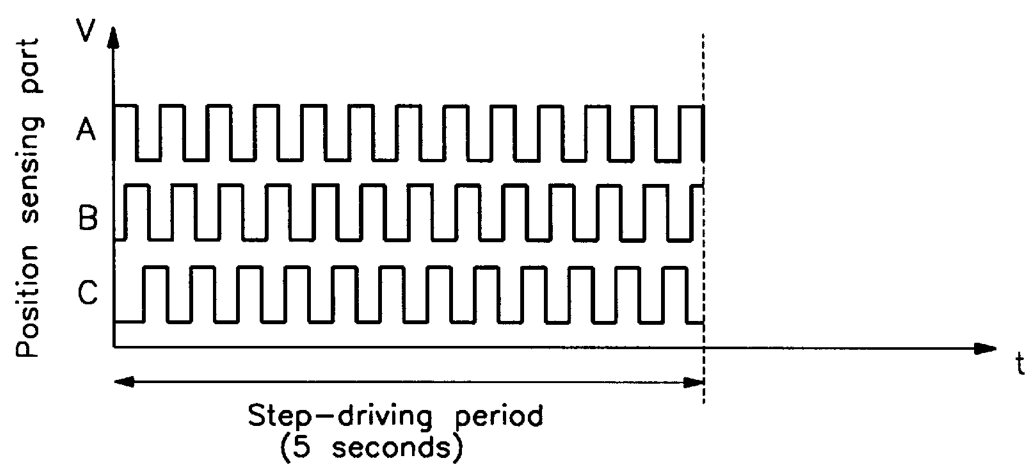

After the period of the initial step-driving has passed, if the RPM of compressor 30 is within the range of a minimum RPM and a maximum RPM, the control part 50 normally controls the compressor 30, as shown in FIG. 3A. Referring to FIG. 3B, if the RPM of compressor 30 does not reach the minimum RPM, for example 500 RPM in a preferred embodiment, during the initial step-driving period, the control part 50 determines that the compressor 30 malfunctions thereby forcing the compressor 30 to be turned off and alerting user to the malfunction of compressor 30 through alarm 80. On the other hand, if the RPM of compressor 30 is over the maximum RPM, for example 3600 RPM in this preferred embodiment, during the initial step-driving period, high RPM signals are produced from the position sensing part 40 as shown in FIG. 3C. Accordingly, if the RPM of the compressor is higher than the maximum RPM, the control part 50 determines that there is a disconnection or a connection trouble between the compressor 30 and the inverter 11. The compressor 30 becomes turned off by the control part 50. Also, the alarm 80 alerts a user to the malfunction or disconnection.

Figure 4:
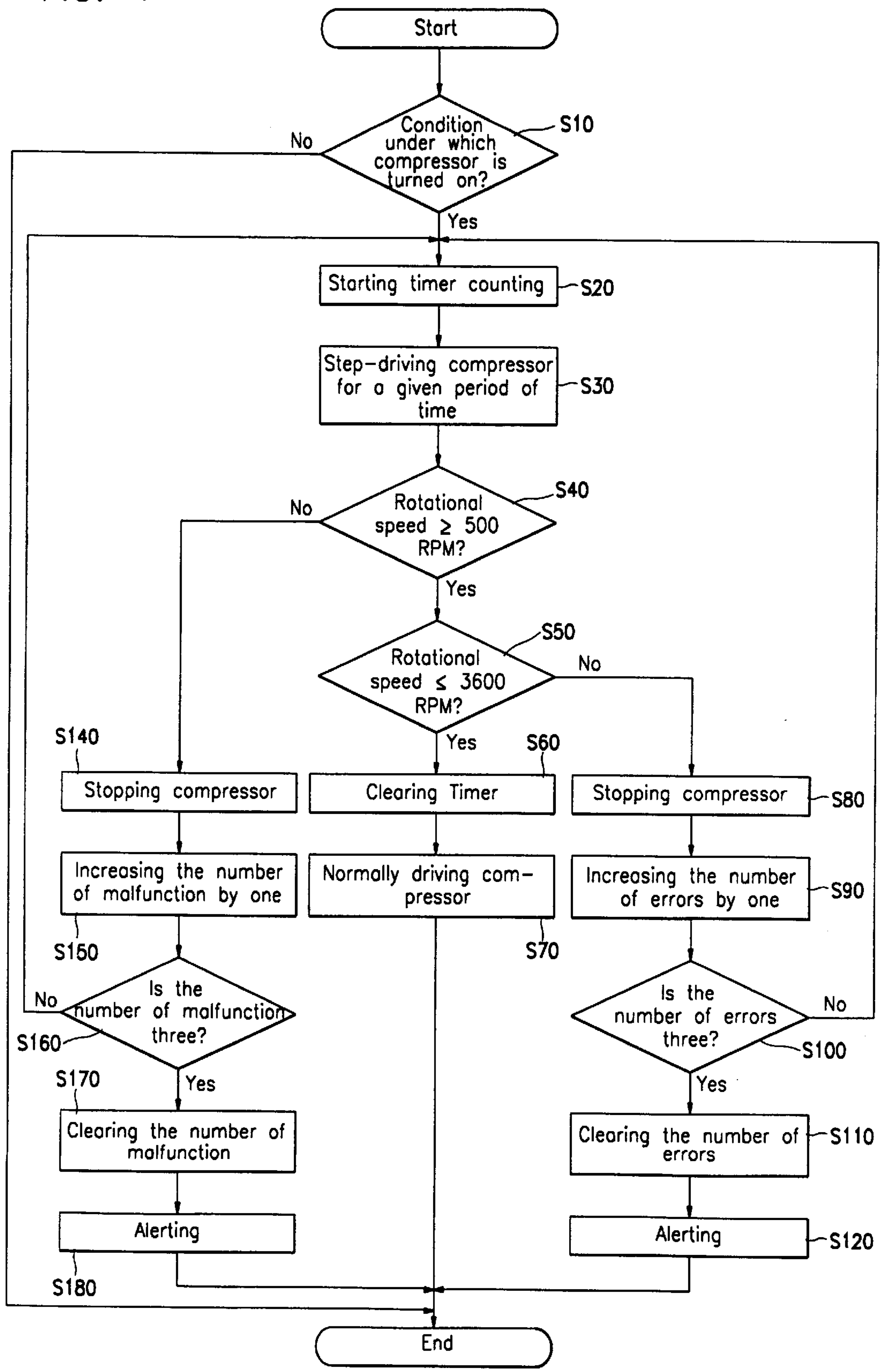
FIG. 4 is a flow chart showing the process for determining a malfunction and a disconnection according to one embodiment for the practice of this invention.

FIG. 4 is a flow chart showing the process for determining the malfunction and the disconnection according to one embodiment for the practice of this invention. S20 allows the control part 50 to turn on the timer 70 and allows the timer 70 to count up to a predetermined period of the time if S10 shows that compressor 30 is turned on. S30 allows the control part 50 to start the initial step-driving and to apply switching signals to the inverter 20 for a given period of time (about 5 seconds). The inverter driving part 60 applies three-phase power signals to compressor 30. The position sensing part 40 senses the reverse electromotive force of each phase line and produces the information about the rotor's position and the RPM. The control part 50 determines the rotor's position and the RPM during the initial step-driving period.

The control part 50 determines whether the RPM of the D.C. motor of compressor 30 is higher than 500 RPM in step S40 and whether the RPM of the D.C. motor of compressor 30 is lower than 3600 RPM rpm in step S50. If the RPM is within the range of between 500 RPM and 3600 RPM, the control part 50 determines that the compressor 30 is normally driven during the initial step-driving period and turns off the timer 70 to clear the counted time in step S60. The control part 50 normally controls the compressor 30 in step S70.

If the RPM is lower than 500 RPM, the control part 50 determines that the compressor malfunctions and forces the inverter driving part 60 to turn off the power transistors (TR1 to TR6) in step S140. Whenever the control part 50 determines the malfunction of the compressor, the number of times of malfunction increases by one in step S150. Step S160 determines if the increased number of the malfunction is three. If the increased number of the malfunction is not three, the control part 50 returns step S20 and restart from step S20. In this preferred embodiment of the present invention, the maximum number of times of malfunction of compressor of 30 is set to three. If the number of times of the malfunction is three, the control part 50 clears the number in step S170 and gives an alert to user visually or audibly through alarm 80.

If the RPM is higher than 3600 rpm in step S50, the control part 40 determines that there is a connection trouble between inverter 20 and compressor 30 as shown in FIG. 3C. The step S80 allows the control part 50 to stop the compressor 30. After stopping the compressor 30, the control part 50 increases the number of times of the connection troubles by one in step S90. Step S100 determines if the increased number of times of the connection troubles is three. The control part 50 determines the connection trouble between the compressor 30 and the inverter 20. The maximum number of times of the connection troubles is set to three in this preferred embodiment of the present invention. Accordingly, if the number of the connection troubles is not three, the control part 50 returns step S20 and restarts from step S20. In a preferred embodiment, the number of step S150 can be used in step S90, vice versa.

When the control part 50 determines that the number of times of the connection troubles is three, the control part 50 clears the number of the connection troubles in step S110 and gives an alert to a user visually or audibly through the alarm 80 in step S120.

As described above, if the RPM of the compressor is lower than a minimum RPM and is not in the normal operation after initial driving of the compressor, the control part determines that the compressor malfunctions. If the number of times of the malfunction is greater than a given number, the control part 50 turns off the compressor and gives an alert to a user. In addition, if the RPM of the compressor is higher than the maximum RPM, the control part 50 determines that there is a connection trouble of the three-phase power lines. If the number of times of the connection troubles is greater than a given number, the control part 50 turns off the compressor and then gives an alert to the user. As a result, the method of this invention allows the compressor to avoid the abnormality and to remove the manufacturing process. Moreover, if there is a malfunction of the compressor or connection trouble between the compressor and the inverter after manufacture, the present invention informs a user of that malfunction and the connection trouble immediately, thereby protecting the internal components and compressor and enhancing the reliability of the refrigerator.

What is claimed is:

1. A method of controlling a refrigerator including an inverter generating three phase powers, a motor driven by said three-phase powers, and a controller controlling said inverter, said method comprising the steps of:

allowing said inverter to drive said motor for a predetermined period of time;

detecting a frequency by using a reverse electromotive force generated between said motor and said inverter;

comparing said frequency with a reference range;

counting the number of times which increases whenever said frequency is out of said range; and determining a state of said refrigerator corresponding to said number of times.

2. The method of claim 1, wherein said state means a malfunction of said motor or a disconnection between said controller and said motor.

3. The method of claim 1, further comprised of the step of allowing said controller to stop said motor when said number of times is a reference number.

4. The method of claim 1, further comprised of the step of determining that a malfunction exists in said inverter or said motor.

5. The method of claim 1, further comprised of the step of determining that a disconnection exists between said inverter and said motor.

6. The method of claim 1, wherein said predetermined period of time is 5 seconds.

7. The method of claim 1, wherein said reference range is up to 3000 RPM.

8. The method of claim 1, wherein said reference range is above 500 RPM.

9. The method of claim 1, wherein the number of times increases by one whenever said frequency is out of said range.

10. The method of claim 1, wherein said reference number is more than 2.

11. The method of claim 1, further comprised of the step of allowing said motor to rotate with higher frequency than 3000 RPM when a malfunction or disconnection exists in said motor and said inverter.

12. The method of claim 1, further comprised of the step of allowing said motor to rotate with lower frequency than 500 RPM when a malfunction or a disconnection exists in said motor and said inverter.

13. The method of claim 1, further comprised of the step of alerting a user to a malfunction of said motor or a disconnection between said controller and said motor corresponding to said state.

14. A method of controlling a refrigerator including an inverter generating three phase powers, a motor driven by said three-phase powers, and a controller controlling said inverter, said method comprising the steps of:

detecting a reverse electromotive force generated between said inverter and said motor;

generating a frequency corresponding to said reverse electromotive force;

comparing said frequency with a reference range having a upper limit and lower limit;

increase a number when said frequency is lower than lower limit or higher than said upper limit; and determining that an abnormal state exists in said refrigerator when said number is greater than a reference number.

15. The method of claim 14, wherein said state means a malfunction of said motor or a disconnection between said controller and said motor.

16. The method of claim 14, further comprised of the step of allowing said controller to stop said motor when said number is greater than said reference number.

17. The method of claim 14, wherein said predetermined period of time is 5 seconds.

18. The method of claim 14, wherein said high limit is 3000 RPM, and said lower limit is 500 RPM.

19. The method of claim 14, wherein said reference number is more than 2.

20. The method of claim 14, further comprised of the step of alerting a user to said state.

21. The method of claim 14, further comprised of the step of allowing said controller to continue to rotate said motor if said frequency is within said reference range.

22. The method of claim 14, further comprised of the step of allowing said controller to continue to rotate said motor if said number is not greater than a reference number.

* * * * *